April 20, 1954  R. J. HARKENRIDER  2,676,071
LUBRICATOR FOR DIESEL LOCOMOTIVE TRACTION
MOTOR SUSPENSION BEARINGS
Filed June 22, 1951  3 Sheets-Sheet 1

INVENTOR.
Robert J. Harkenrider
BY
Mann, Brown and Hansmann
Attys.

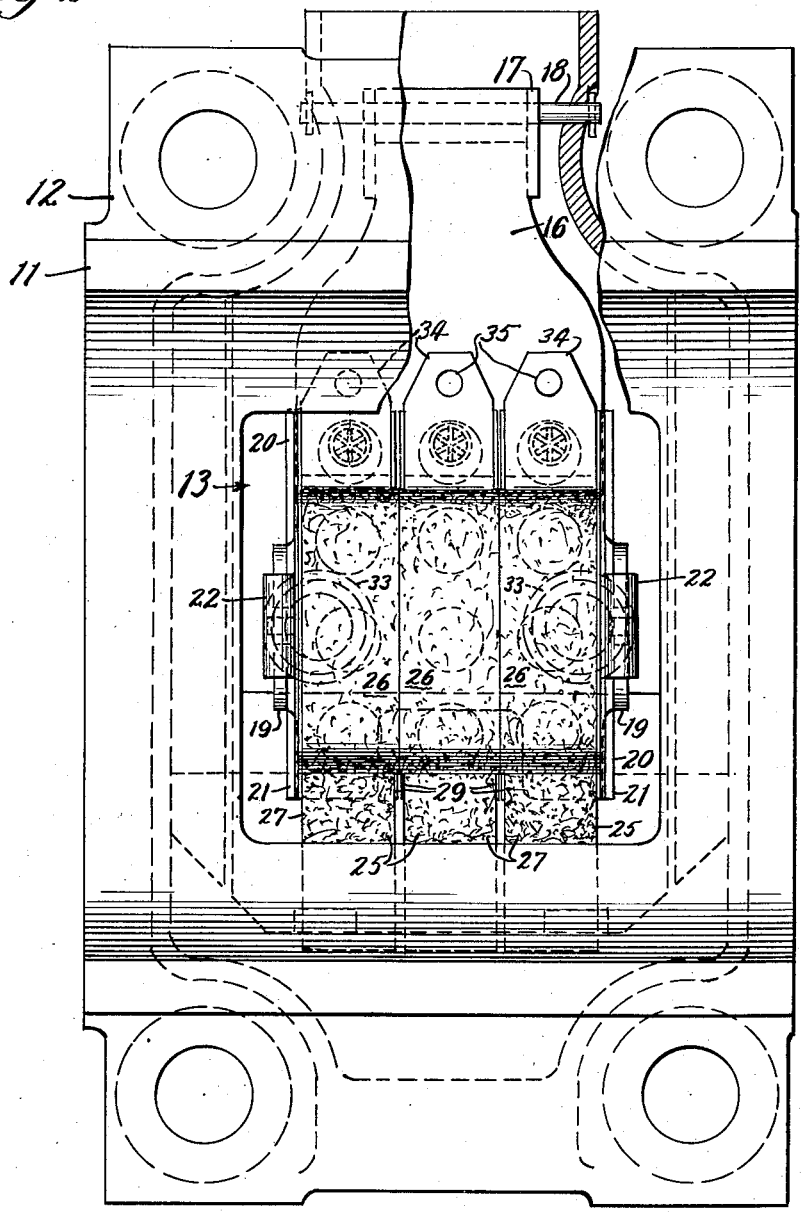

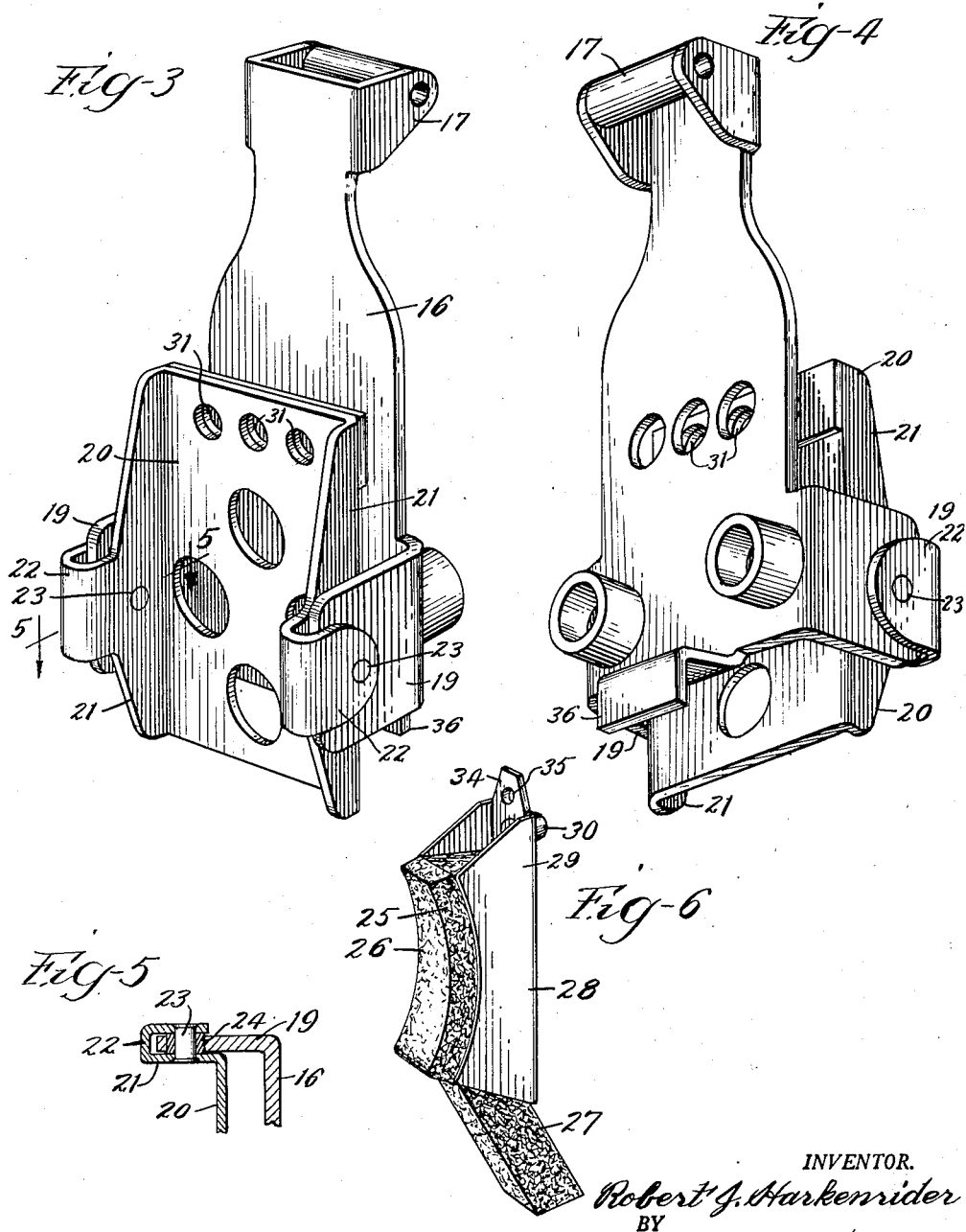

Patented Apr. 20, 1954

2,676,071

UNITED STATES PATENT OFFICE 2,676,071

LUBRICATOR FOR DIESEL LOCOMOTIVE TRACTION MOTOR SUSPENSION BEARINGS

Robert J. Harkenrider, Winona, Minn., assignor to Gladys D. Miller, Winona, Minn.

Application June 22, 1951, Serial No. 232,962

5 Claims. (Cl. 308—132)

This invention relates to a lubricator to take the place of the waste packing in traction motor suspension bearings of diesel locomotives, and has for its principal object to provide a self-adjusting device that can be inserted into an axle cap and hinged to it in place of the customary waste pusher spring plate.

Further objects and advantages of the invention will appear as the description is read in connection with the accompanying drawings, in which Fig. 1 is a section through an axle journal, its bearing, and the axle cap equipped with a lubricator embodying this invention;

Fig. 2 is an elevation looking at the face of the axle cap removed from the axle;

Figs. 3 and 4 are perspective views of the appliance for holding the lubricator felts against the journal;

Fig. 5 is a section on the line 5—5 of Fig. 3; and

Fig. 6 is a perspective view of one of the felt applicators and its holders.

Figure 1:
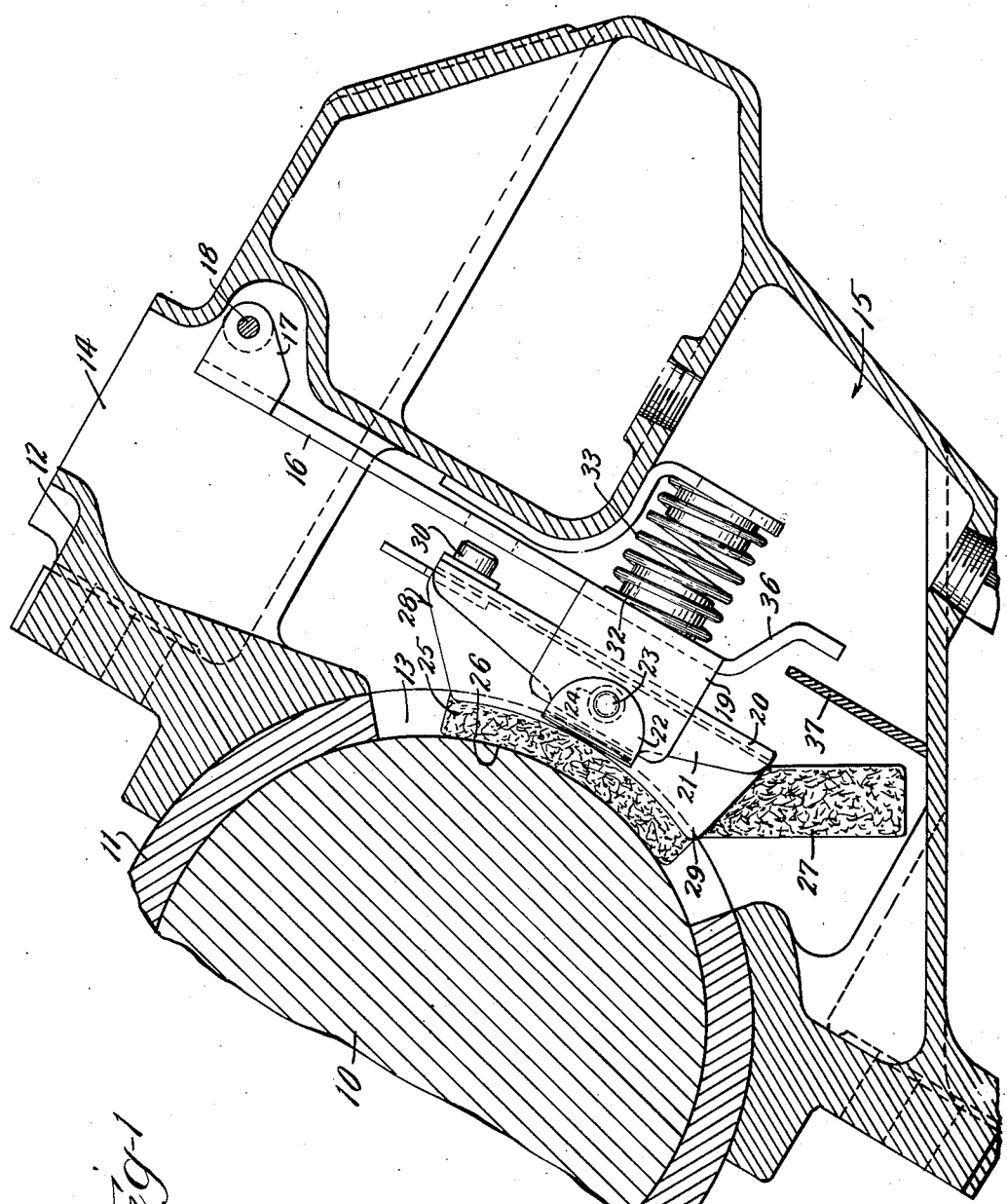

In Fig. 1, 10 is an axle journal in the bearing liner 11; 12 is an axle cap having a window opening 13, a filling opening 14, and an oil reservoir 15. In such axle caps, the journal was lubricated by waste inserted through the opening 14 and dipping into the oil in the reservoir 15 while a waste pusher plate urged it always toward the journal.

According to this invention, the waste and the waste pusher plate are eliminated.

In the place of the waste pusher plate is a tapered base plate 16 having hinge lugs 17 hinged to the axle cap by the hinge pintle 18 for the waste pusher plate.

The base plate 16 has widely spaced side flanges 19 projecting forwardly and hinged to a felt carrier or supporting member 20, presenting a broad face between side flanges 21, which have ears 22 astride the flanges 19 and hinged to them by rivets 23 and bushings 24 (see Fig. 5).

The carrier or supporting member receives a set of felt applicators generally indicated by 25, each of which includes a thick portion with a rounded, concavely curved surface 26 to bear against the portion of the journal to be lubricated and a depending portion 27 forming a wick to dip into the reservoir 15 and raise the oil to the applicator surface.

Each of those felt bodies is provided with a holder 28 having flanges 29 to grasp the sides of the felt and hold it against undue expansion or brooming in use.

Each holder is provided with a mounting stud 30 adapted to be received in one of a set of openings 31 in the carrier 20, where the set of felt bodies is received side by side, as in the patent to Miller No. 2,540,829, February 6, 1951.

The plate 16 is provided with spring guides 32 cooperating with springs 33, which may be the same or like the same that urged the waste plate toward the journal. They serve to swing the lubricating appliance about the hinge pintle 18 and constantly urge the felts through the window opening against the journal 10.

The pivotal mounting of the carrier or supporting member enables the felts to automatically adjust themselves to proper position on the journal as the spring pressure urges them in that direction.

Each holder 28 is provided with a projection 34 having an opening 35 to receive a hook by which the felt applicators can be inserted or removed.

When a set of applicators is to be changed, pressure is put on the plate 16 to compress the springs 33, when the hook can be applied to the projections 34 one at a time and the set of applicators removed. By a similar operation, a new set is installed.

Plate 16 is provided with a depending lug 36, which cooperates with the limit plate 37 to prevent the metal of the holders 28 from ever coming against the journal.

As a rule, the opening 14 in the axle cap is too narrow to admit the wide end of the appliance shown in Figs. 3 and 4. Hence, it is inserted through the window opening 13 before the cap is put in place and made fast by inserting the pintle 18.

I claim:

1. In combination with a traction motor journal having an axle cap provided with a window opening and having a waste pusher pintle parallel to the axis of the journal, a plate replacing the waste pusher hinged adjacent to one end to said pintle, a carrier hinged to the plate adjacent to its other end to swing about a pivot axis parallel to said pintle and journal axes, a set of lubricator felts detachably mounted on the carrier, and resilient means reacting between the cap and plate and adapted to urge the plate toward the journal to be lubricated through the window opening.

2. In combination with a traction motor journal having an axle cap provided with a window opening and having a waste pusher pintle parallel to the axis of the journal, a plate hinged at one end to said pintle and having flanges at its other end directed toward said window opening, a carrier hinged to the flanges, a felt holder on the carrier, means interlocking the felt holder with the carrier, a felt body on the holder, and resilient means reacting between the cap and the plate and adapted to swing the plate toward the window opening and press the felt body against the journal to be lubricated.

3. In combination with a traction motor journal having an axle cap provided with a window opening and having a waste pusher pintle parallel to the axis of the journal, a plate replacting the waste pusher hinged adjacent to one end to said pintle, a carrier hinged to the plate adjacent to its other end to swing about a pivot axis parallel to said pintle and journal axes, lubrication applicator means mounted on the carrier, and resilient means reacting between the cap and plate and adapted to urge the plate toward the window opening and the applicator means into contact with the journal.

4. In combination with a traction motor journal having an axle cap having an oil reservoir surmounted by a window opening and a waste pusher pintle parallel to the axis of the journal, a plate replacing the waste pusher hinged adjacent to one end to said pintle, a carrier hinged to the plate adjacent to its other end to swing about a pivot axis parallel to said pintle and journal axes, felt applicator means having its upper portion mounted on the carrier and having a lower portion depending as a wick into the reservoir, and resilient means reacting between the cap and plate and adapted to urge the plate toward the window opening and the upper portion of the applicator means into contact with the journal.

5. In combination with a traction motor journal having an axle cap having an oil reservoir surmounted by a window opening and a waste pusher pintle parallel to the axis of the journal, a plate replacing the waste pusher hinged adjacent to one end to said pintle, a carrier hinged to the plate adjacent to its other end to swing about a pivot axis parallel to said pintle and journal axes, a set of lubricator felts each having its upper portion detachably mounted on the carrier and having a lower portion depending as a wick into the reservoir, and resilient means reacting between the cap and plate and adapted to urge the plate toward the window opening and the upper portions of the felts into contact with the journal.

References Cited in the file of this patent

UNITED STATES PATENTS

| Number | Name | Date |
|---|---|---|
| 334,013 | Gibbons | Jan. 12, 1886 |
| 358,583 | Timms | Mar. 1, 1887 |
| 2,021,715 | Cooper | Nov. 19, 1935 |
| 2,540,829 | Miller | Feb. 6, 1951 |